Feb. 21, 1928.

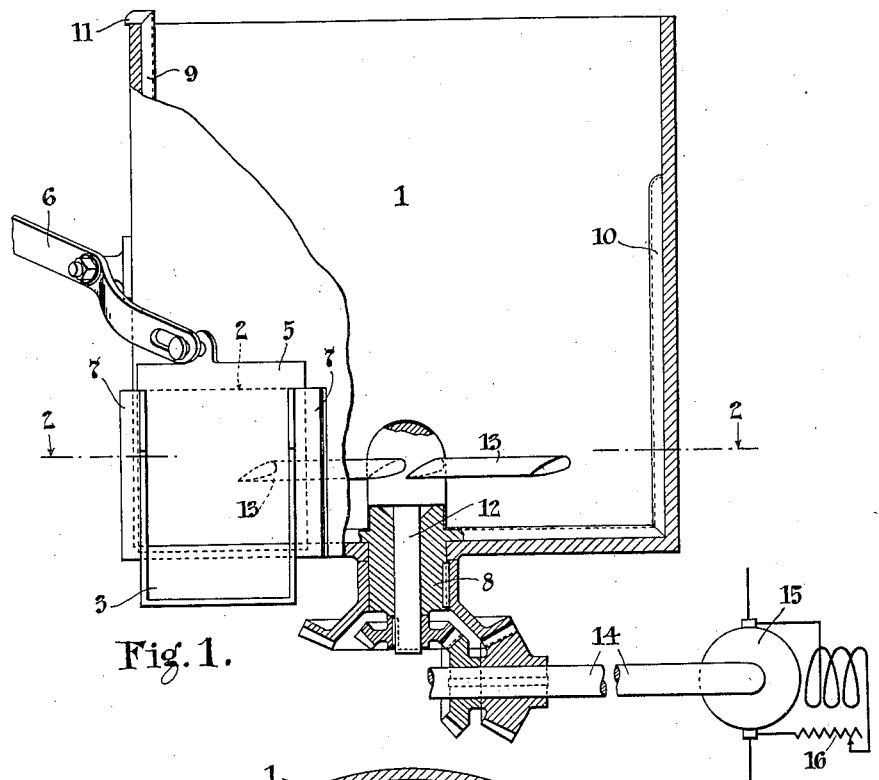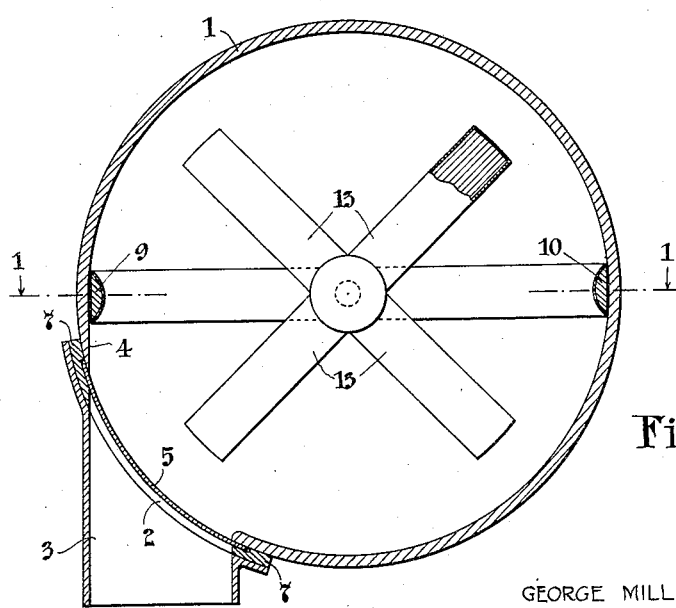

G. M. THOMSON 1,660,242

PROCESS AND APPARATUS FOR MIXING QUICK SETTING CEMENTITIOUS MATERIALS

Filed Feb. 16, 1927    2 Sheets-Sheet 2

GEORGE MILLER THOMSON
INVENTOR.

BY *Marks & Clerk* ATTORNEYS.

Patented Feb. 21, 1928.

1,660,242

UNITED STATES PATENT OFFICE.

GEORGE MILLER THOMSON, OF CALEDONIA, ONTARIO, CANADA, ASSIGNOR TO PENNSYLVANIA GYPSUM COMPANY, OF CHESTER, PENNSYLVANIA, A CORPORATION OF DELAWARE.

PROCESS AND APPARATUS FOR MIXING QUICK-SETTING CEMENTITIOUS MATERIALS.

Application filed February 16, 1927. Serial No. 168,764.

This invention relates to a process and apparatus for mixing quick-setting cementitious materials, and while not limited thereto, is particularly directed to the production of cellular building materials from gypsum.

In the utilization of quick-setting cementitious materials for structural purposes, control or regulation of hydration is a very important factor. When hydration of such material as calcined gypsum is effected, the tendency is for crystallization or setting to promptly begin within the material. If the hydration of the material is only partially complete when the crystallization or setting begins, the strength of the finished product will not be as great as if complete hydration were effected before setting begins. This point may be illustrated by reference to plaster of Paris. The strength of plaster of Paris is due essentially to the bridging and interlocking actions of the needle-like crystals and, in order to secure the full advantages of these actions, crystallization should proceed under most favourable conditions.

It is thus an object of this invention to provide a process and self-cleaning apparatus for mixing such quick-setting cementitious material, of such a character that the reactions, which occur in the treatment of the material, may be controlled to the best advantage.

While the invention is applicable to quick-setting cementitious materials generally, it will be particularly described with respect to plaster of Paris, for clearness of illustration.

The natural strength of gypsum is greater than that of products prepared therefrom by hydration of the calcined gypsum by the methods usually employed. If, however, hydration is uniformly and effectively carried out so that crystallization or setting may take place in the most desired manner, a product may be obtained which will have greater strength than the natural material. It will be apparent that best results are not obtained when crystallization proceeds before hydration of the mass is completed. The crystallization should take place so that the crystal groups will bond into, not onto, each other.

In the commercial treatment of these materials, it is frequently necessary to cause the normal setting to take place within a limited period of time, so that the product in block or other form may be removed. To effect this, use has been made of accelerators, such as plaster of Paris crystals, upon which the hydrated product sets. This imparts a weakness to the finished product in that the complete intermingling or interbonding of all the crystals is not obtained.

In accordance with this invention, therefore, a complete uniform and simultaneous hydration of the calcined gypsum is effected by regulated mixing of the material with water. By regulating the rate of agitating the slurry of calcined gypsum and water, the hydration and therefore the crystallization or time of initial set may be controlled. The use of crystals or other such accelerators is not necessary.

The invention will now be described with reference to the accompanying drawings which illustrate the apparatus of this invention in which Figure 1 is an elevation partly in section on line 1—1 of Figure 2;

Figure 2 is a section on line 2—2 of Figure 1;

Figure 3:
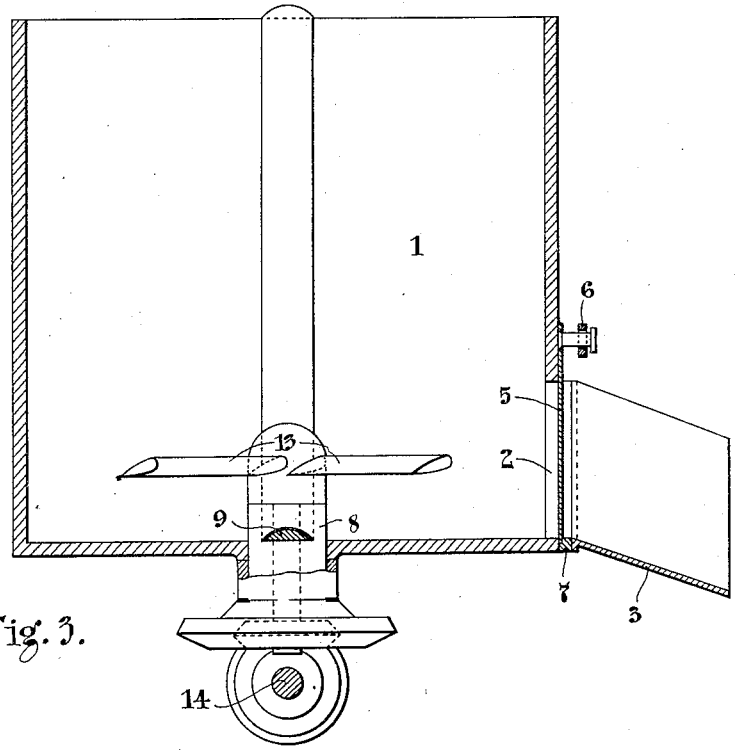
Figure 3 is a section on line 3—3 of Figure 4.

In the drawings, 1 represents a mixing chamber having a discharge opening 2 at the bottom. A discharge chute 3 is secured to the chamber at a tangent to the inner circumference thereof at the point 4, so as to provide for the unobstructed discharge of the material under treatment. A gate 5 operated by the lever 6 within the guides 7 regulates the extent of the discharge opening.

Figure 4:
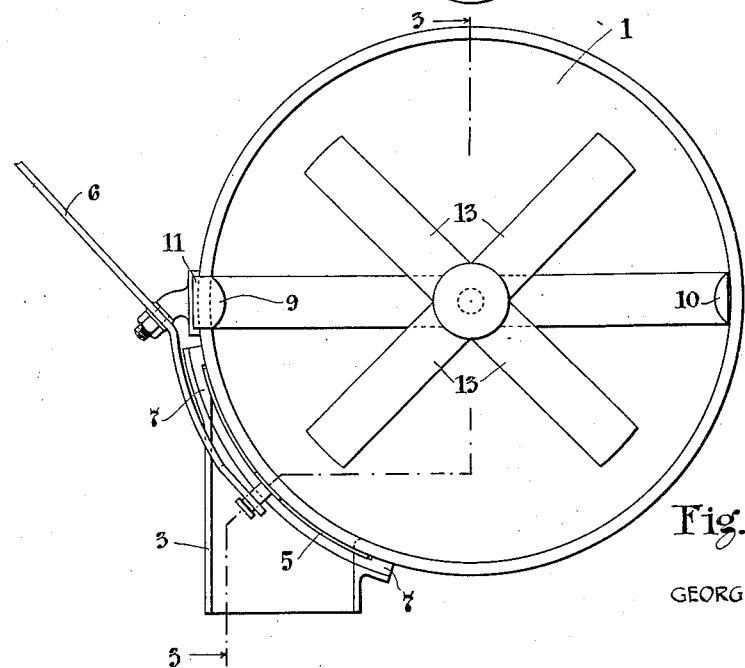
Figure 4 is a plan view.

The shaft 8 carries scrapers 9 and 10, both of which are substantially in contact with the walls of the chamber. The scrapers have double stream-line contour, as illustrated in Figures 2 and 4, and scraper 9 has a lug 11 which bears on the top edge of the mixer for a purpose to be later described. The shaft 12 carries impellers 13 which have a stream-line contour to the rear. The impellers are arranged on the shaft in an inclined plane, with the forward edge higher than the rear edge, as illustrated. The shafts 8 and 12 are rotated at different speeds by the driving shaft 14 operated by a variable speed drive, as illustrated by the motor 15 and rheostat 16.

The apparatus or mixer is self-cleaning and to insure the absence of crystallization or setting of particles on any portion of the apparatus, all parts of the mixer which are not directly cleaned by the scrapers may be, and preferably are, covered with a soft rubber. It will be noted that the scrapers keep the inner surface of the chamber clean, and the surfaces here in contact do not require the rubber coating. The exposed surface of the scrapers, the impellers, the hub or end of the shafts and the inner surface of the discharge trough may take on crystal particles, and to avoid this they are preferably covered with rubber. The rubber covered surfaces being in contact with wet slurry become wet and in this condition crystals will not readily adhere thereto. In the drawings the rubber coating is illustrated, for convenience, on portions only of the parts mentioned, in Figure 1 on the scrapers and end of the shaft and in Figure 2 on a portion of one of the impellers.

The operation of the apparatus is as follows:

The calcined gypsum or similar material and water or a mixture of the two is fed into the chamber 1. The scrapers and impellers are each rotated at a desired speed by regulation of the variable speed drive to agitate the mixture to effectively hydrate the material. When the charge has accumulated and the lower portion has been uniformly and completely hydrated, the gate 5 is opened to permit a controlled discharge of hydrated material to the next stage of production. The impellers, being mounted at an angle as described, will tend to force the downward discharge of the material. The gate should be so controlled that the discharge opening is always covered by the slurry, so that air will not be discharged with the slurry.

The impellers and scrapers rotate in the same direction and preferably at relatively different rates, so as not to interfere with the tangential discharge of the material and to secure more effective agitation. The scrapers preferably travel at the slower rate and thus are less likely to throw slurry out at the top of the mixer. The single stream-line contour of the impellers overcomes the formation of eddies or relatively unagitated zones in the path of the impellers, while the double stream-line contour of the scrapers produces the same result in their operation. The stream-line contours provide for self-cleaning of the impellers and scrapers.

The rate of hydration of the material varies with the rate of agitation, which is controlled by the speed of drive, and the time of initial setting is dependent upon the hydration; therefore, the impellers are caused to rotate at a rate determined by the time allowable for the initial set. For example, in a particular case, it was found that when agitation was effected at a rate of 180 R. P. M. of the impellers, the normal set of the hydrated material took place in about 16 minutes. When the rate of agitation was increased to 340 R. P. M. of the impellers, a substantially hard set of hydrated material was obtained in approximately 3 minutes. These figures are given merely as illustrative of the effect of the rate of agitation and, therefore, hydration of the finished material, and are not to be regarded in any limiting sense whatever. Obviously various factors, such as size of mixer, quantity of output, etc., will affect the relative rates of agitation to secure normal set in two given periods. Thus, experience in the operation of a given mixer of this character will indicate the variation necessary in the rate of agitation to secure the desired change of the time of the normal set. It will, however, be understood that the extent of agitation, controlled by the rate of rotation of the impellers, regulates the rate of hydration and controls the setting of the material, whereby the complete intermingling and inter-bonding of the crsystals are obtained to produce the strongest material of this character. The hydration should be effected as quickly as possible by the agitation, and the completely hydrated material should be discharged from the mixer promptly. The material so produced may be regarded as a unitary mass of interlocking crystals firmly bridged or bonded together.

It is important to prevent the admission of crystals or set particles to the mixing chamber, as such particles tend to act as an accelerator. Due to agitation or other causes material may lodge on the upper edge of the chamber and, after setting, such material may fall into the charge. The lug 11 on the scraper 9 is thus provided to remove such particles and throw them outwardly away from the chamber. The scrapers keep the inner surfaces of the chamber clean, and although there is less tendency for the material to set on the moving parts, the provision of the rubber coating described will eliminate such tendency. The mixer is thus kept clean throughout its operation.

As a further indication of the desirability of being able to readily regulate the time of normal setting, it may be mentioned that when the hydrated material is to be used for making board in the usual way, the setting must not take place too quickly in order that succeeding operations may be carried out as required.

When a cellular product is to be produced, bubbles are formed in, or foam introduced into, the mixture in any desired way, and this invention is equally applicable to the treatment of the material with or without foam.

It will be obvious that any type of variable speed drive may be used instead of the form illustrated. Furthermore, a variable speed drive is required only for a mixer which is used under varying conditions, as to time of setting. Where the time of setting is constant, a fixed speed drive may be used in accordance with this invention.

While the invention has been described in detail, it is not to be regarded as limited to such details, which are given to illustrate a practical embodiment of the invention. The following claims therefore are to be interpreted as broadly as the prior art will allow.

The terms "variable characteristics" and "effective characteristics" used in the appended claims are intended to mean those characteristics of the material under treatment and of the water, which are not constant but vary from time to time and which have directly or indirectly an effect or influence on the time of setting of the material. Among such characteristics may be mentioned temperature and composition (including impurities in the material or water).

I claim:—

1. A process of mixing quick-setting cementitious materials, comprising controlling the time of normal setting by regulation of the rate of agitation to effect hydration in accordance with variations in variable characteristics of the materials being mixed.

2. In a process of mixing quick setting cementitious material, decreasing the time of normal setting by regulating the rate of agitation at a progressively increasing ratio to effect hydration.

3. In a process of mixing quick setting cementitious material, the method of controlling the time of normal setting of said material, which comprises varying the rate of agitation to effect a disproportional variation in the time of setting, the time of setting being disproportionally less than a given increase in the rate of agitation.

4. In a process of mixing quick setting cementitious material, decreasing the time of normal setting of the material by increasing the rate of agitation, the increase in the rate of agitation being proportionally less than the decrease in the time of setting.

5. A process of hydrating quick-setting cementitious materials which comprises mixing the materials with water, agitating the mixture and controlling the rate of agitation in accordance with variations in effective characteristics of the materials to produce a mixture which will set in the required period.

6. A process of hydrating calcined gypsum, which comprises mixing the gypsum with water, agitating the mixture and controlling the rate of agitation in accordance with variations in the temperature and other variable characteristics of the gypsum and water to produce a mixture which will set in the required period.

7. A process of hydrating calcined gypsum which comprises mixing the gypsum with water, agitating the mixture in an agitating zone, preventing the crystallization or setting of particles within said zone and controlling the time of setting of the mixture by regulation of the rate of said agitation to compensate for variations in effective characteristics of the gypsum.

8. A process of hydrating calcined gypsum which comprises mixing the gypsum with water, agitating the mixture in an agitating zone, preventing the crystallization or setting of particles within said zone and controlling the time of setting of the mixture by regulation of the rate of said agitation to compensate for variations in effective characteristics of the gypsum and water.

9. A process of hydrating quick-setting cementitious materials which comprises mixing the material with water, agitating the mixture in an agitating zone, preventing the crystallization or setting of particles within said zone and discharging the material centrifugally from said zone.

10. Apparatus for mixing quick-setting cementitious materials comprising in combination a mixing chamber, means for agitating said material to hydrate the same, means for preventing crystallization of the material in said chamber, means for centrifugally discharging the material from said mixing chamber in its uncrystallized state.

11. Apparatus for mixing quick-setting cementitious materials, comprising in combination a mixing chamber, means having a single stream-line contour for agitating said material, means having a double stream-line contour for preventing crystallization during agitation and means for centrifugally discharging the material from said chamber in its uncrystallized state.

12. Apparatus as defined in claim 11, having adjustable means for controlling said discharge to maintain the level of the mixture in the chamber above said discharge means.

13. Apparatus, for mixing quick-setting cementitious materials, comprising in combination a mixing chamber, means for agitating said material, means for centrifugally discharging the material from said chamber to prevent crystal setting at said discharge, and means for varying the movement of said agitating means in accordance with variations in effective characteristics of said material.

In testimony whereof I affix my signature.

GEORGE M. THOMSON.